(12) United States Patent
Ikeuchi et al.

(10) Patent No.: US 8,930,748 B2
(45) Date of Patent: Jan. 6, 2015

(54) STORAGE APPARATUS AND CONTROLLER

(75) Inventors: Kazuhiko Ikeuchi, Kawasaki (JP);
Hidejirou Daikokuya, Kawasaki (JP);
Chikashi Maeda, Kawasaki (JP);
Norihide Kubota, Kawasaki (JP);
Atsushi Igashira, Kawasaki (JP); Kenji Kobayashi, Kawasaki (JP); Ryouta Tsukahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 292 days.

(21) Appl. No.: 13/371,503

(22) Filed: Feb. 13, 2012

(65) Prior Publication Data
US 2012/0236427 A1    Sep. 20, 2012

(30) Foreign Application Priority Data

Mar. 17, 2011    (JP) ................. 2011-059229

(51) Int. Cl.
| G06F 11/00 | (2006.01) |
| G11B 27/36 | (2006.01) |
| G11B 27/00 | (2006.01) |
| G06F 11/20 | (2006.01) |

(52) U.S. Cl.
CPC ............. *G11B 27/36* (2013.01); *G11B 27/002* (2013.01); *G06F 11/2082* (2013.01); *G06F 11/2094* (2013.01)
USPC ......................................... 714/6.32; 714/6.22

(58) Field of Classification Search
CPC ............ G06F 11/1076; G06F 11/1088; G06F 11/1092; G06F 11/1662; G06F 11/2094
USPC ........................................ 714/6.2, 6.22, 6.32
See application file for complete search history.

(56) References Cited

U.S. PATENT DOCUMENTS

| 6,467,023 | B1 * | 10/2002 | DeKoning et al. ............. 711/114 |
| 6,851,022 | B2 * | 2/2005 | Ikeuchi et al. ................. 711/114 |
| 6,898,668 | B2 * | 5/2005 | Thompson et al. ............ 711/114 |
| 2004/0215877 | A1 * | 10/2004 | Chatterjee et al. ............ 711/114 |
| 2004/0216012 | A1 * | 10/2004 | Ashmore et al. ................ 714/42 |
| 2005/0076260 | A1 * | 4/2005 | Hung ................................ 714/6 |
| 2006/0212748 | A1 * | 9/2006 | Mochizuki et al. ............... 714/6 |
| 2009/0031167 | A1 * | 1/2009 | Onabe et al. ...................... 714/6 |
| 2009/0044043 | A1 * | 2/2009 | Cherian et al. .................... 714/6 |
| 2010/0332893 | A1 * | 12/2010 | D'Souza et al. .................. 714/6 |

FOREIGN PATENT DOCUMENTS

| JP | 11-102261 A | 4/1999 |
| JP | 2003-029933 A | 1/2003 |

* cited by examiner

*Primary Examiner* — Marc Duncan
(74) *Attorney, Agent, or Firm* — Fujitsu Patent Center

(57) ABSTRACT

A storage apparatus includes a plurality of first storage mediums in which data is redundantly stored and a controller. The controller includes a formatting section which performs formatting in each of the plurality of first storage mediums, a detection section which detects a failure that has occurred in the plurality of first storage mediums, a control section which makes the formatting section stop the formatting at the time of the detection of the failure by the detection section and which rebuilds the data stored in the plurality of first storage mediums in which the failure has occurred in a second storage medium other than the plurality of first storage mediums, and a rebuild processing section which rebuilds the data stored in the plurality of first storage mediums in the second storage medium in accordance with instructions from the control section.

6 Claims, 8 Drawing Sheets

FIG. 4

WRITE MANAGEMENT TABLE 114a

| LUN | LUN0 | LUN1 | LUN2 | LUN3 | ... | LUNn |
|-----|------|------|------|------|-----|------|
| QF  | YES  | NO   | YES  | NO   | ... | NO   |

STORAGE APPARATUS AND CONTROLLER

CROSS-REFERENCE TO RELATED APPLICATION

This application is based upon and claims the benefit of priority of the prior Japanese Patent Application No. 2011-059229, filed on Mar. 17, 2011, the entire contents of which are incorporated herein by reference.

FIELD

The embodiments discussed herein are related to a storage apparatus and a controller.

BACKGROUND

It is known that formatting a storage medium, such as an HDD (Hard Disk Drive), is performed as a first process for accessing all storage areas in the storage medium. With the formatting all the storage areas are accessed. Accordingly, there is a strong possibility that abnormal writing to the storage medium, for example, is detected first.

In addition, it is known that when abnormal writing to the storage medium occurs during the formatting, the process of rebuilding data in another storage medium (rebuild process) is performed.

Japanese Laid-open Patent Publication No. 2003-29933

If the formatting and the rebuild process are performed at the same time, the load on a CPU increases. This delays the completion of the formatting.

SUMMARY

According to one aspect, there is provided a storage apparatus that includes: a plurality of first storage mediums configured to redundantly store data; and one or more processors connected to the plurality of first storage mediums via a communication line for controlling writing of information to the plurality of first storage mediums and configured to perform a procedure that includes performing formatting in each of the plurality of first storage mediums, detecting a failure that has occurred in the plurality of first storage mediums, and stopping the formatting at the time of the detection of the failure and rebuilding the data stored in the plurality of first storage mediums in which the failure has occurred in a second storage medium other than the plurality of first storage mediums.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an example of a write management table;

DESCRIPTION OF EMBODIMENTS

Figure 1:
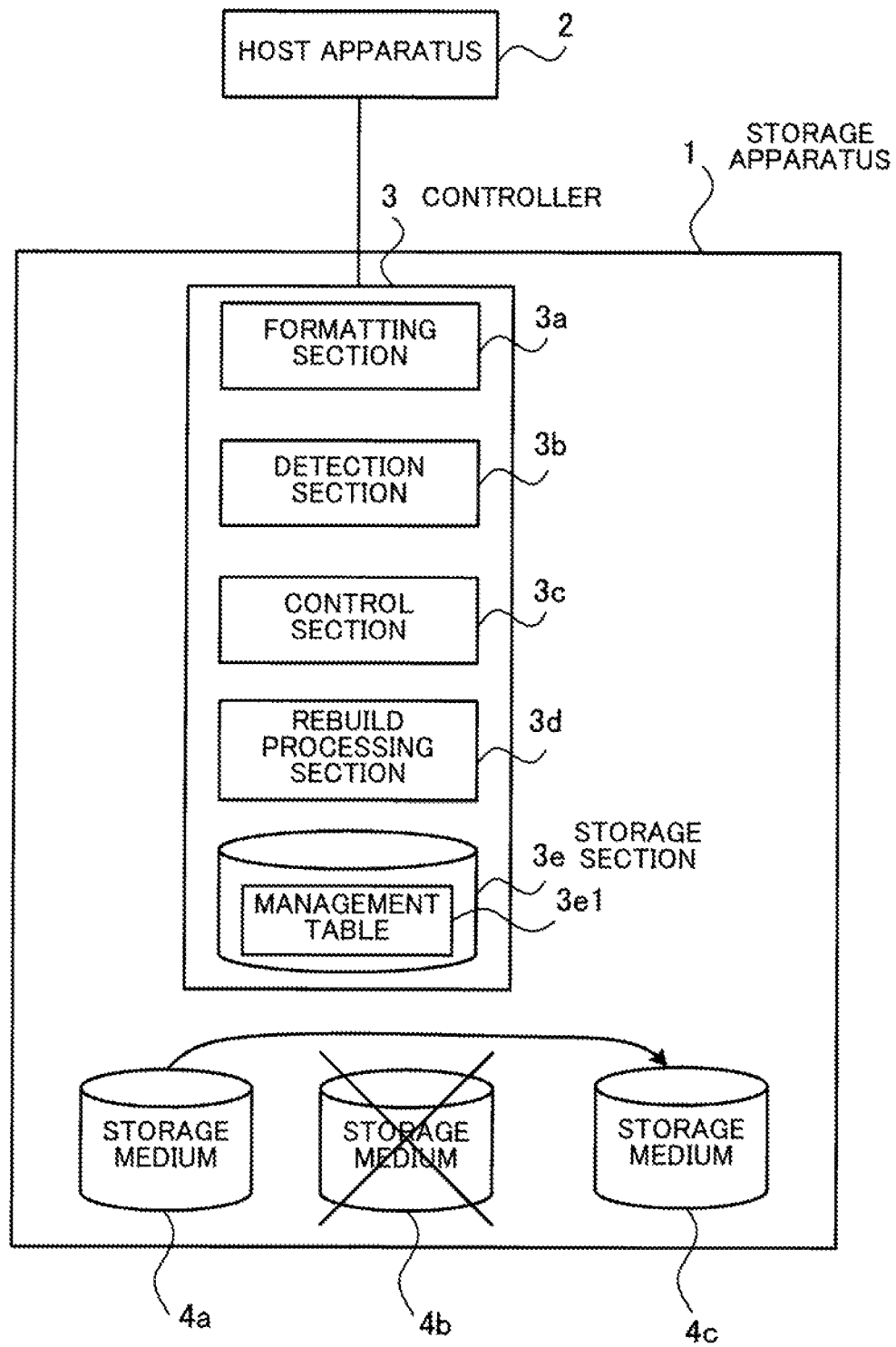
FIG. 1 illustrates a storage apparatus according to a first embodiment.

Embodiments of the present invention will now be described in detail with reference to the accompanying drawings, wherein like reference numerals refer to like elements throughout.

(First Embodiment)

FIG. 1 illustrates a storage apparatus according to a first embodiment.

A storage apparatus 1 according to a first embodiment is connected to a host apparatus 2 via an electric communication line, an optical communication line, or the like.

The storage apparatus 1 includes a controller 3 and storage mediums 4a, 4b, and 4c. The storage mediums 4a, 4b, and 4c have storage areas in which information can be stored. The storage mediums 4a, 4b, and 4c are HDDs, SSDs (Solid State Drives), or the like. The storage apparatus 1 according to the first embodiment includes the three storage mediums 4a, 4b, and 4c. However, the number of storage mediums may be two or less or four or more.

Each of the storage mediums 4a and 4b is an example of a first storage medium. Data is redundantly stored in the storage mediums 4a and 4b. That is to say, the same data is stored in the storage mediums 4a and 4b. Furthermore, the storage medium 4c is an example of a second storage medium. In FIG. 1, the storage medium 4c is included in advance in the storage apparatus 1. However, the storage medium 4c may be mounted in the storage apparatus 1 at the time of the occurrence of a failure.

The controller 3 is connected to the storage mediums 4a, 4b, and 4c via communication lines (not illustrated). The controller 3 controls data access from the host apparatus 2 to the storage mediums 4a, 4b, and 4c. That is to say, the controller 3 controls writing data to the storage medium 4a, 4b, or 4c which is accepted from the host apparatus 2 and reading out data stored in the storage medium 4a, 4b, or 4c which is accepted from the host apparatus 2.

The controller 3 includes a formatting section 3a, a detection section 3b, a control section 3c, a rebuild processing section 3d, and a storage section 3e.

The formatting section 3a performs formatting in each of the storage mediums 4a and 4b. In addition, the formatting section 3a manages the progress of the formatting performed in each of the storage mediums 4a and 4b.

For example, if logical storage areas which are formed by logically dividing a storage area are formed in the storage mediums 4a and 4b, then the formatting can be performed by the logical storage area.

The detection section 3b detects a failure which occurs in the storage medium 4a or 4b. For example, if reading out data from the storage medium 4b or writing data to the storage medium 4b fails one or more times due to a fault or the like in the storage medium 4b, then the detection section 3b can determine that a failure has occurred in the storage medium 4b. FIG. 1 indicates (by the mark "X") a state in which a failure has occurred in the storage medium 4b.

When the detection section 3b detects the failure, the control section 3c makes the formatting section 3a stop the formatting. The control section 3c then makes the rebuild processing section 3*d* rebuild data stored in the storage medium 4*b* in which the failure has occurred in the storage medium 4*c*.

In accordance with instructions from the control section 3*c*, the rebuild processing section 3*d* rebuilds the data stored in the storage medium 4*b* in the storage medium 4*c*.

The formatting and the rebuild process are performed separately as a result of the processes by the control section 3*c* and the rebuild processing section 3*d*. Accordingly, it is possible to avoid performing the formatting and the rebuild process at the same time. As a result, a delay caused by performing the formatting and the rebuild process at the same time can be controlled. For example, if the rebuild process drags on, a fault may occur in the storage medium 4*a* in which a fault has not occurred and stored data may be lost. However, avoiding performing the formatting and the rebuild process at the same time prevents this possibility.

In addition, by avoiding performing the formatting and the rebuild process at the same time, time taken to perform the rebuild process can be determined comparatively easily compared with the case where the formatting and the rebuild process are performed at the same time. Accordingly, time taken to perform each of the formatting and the rebuild process can be estimated easily.

Furthermore, the storage section 3*e* stores a management table 3*e*1 indicative of whether or not data is written to the storage medium 4*a* or 4*b* in which the formatting section 3*a* is performing formatting. The management table 3*e*1 can indicate by the logical storage area whether or not data is written to the storage medium 4*a* or 4*b*.

The control section 3*c* refers to the management table 3*e*1 and determines whether or not data is written to the storage medium 4*b* in which the failure has occurred. If data is not written to the storage medium 4*b*, then the control section 3*c* omits rebuilding data stored in a logical storage area in which the formatting section 3*a* is performing formatting in the storage medium 4*c*. The logical storage area is to be formatted by formatting performed later. Accordingly, the extra trouble of performing a rebuild process and rebuilding data can be saved by this process by the control section 3*c*. Furthermore, the control section 3*c* may make the formatting section 3*a* begin to perform formatting from the first in logical storage areas of the first storage mediums 4*a* and 4*b* for which a rebuild process is omitted and in which a failure has not occurred. By doing so, formatting can be performed in the logical storage areas of the first storage mediums 4*a* and 4*b* for which a rebuild process is omitted.

The formatting section 3*a*, the detection section 3*b*, the control section 3*c*, the rebuild processing section 3*d*, and the storage section 3*e* can be realized by functions which a CPU (Central Processing Unit) included in the controller 3 has. In addition, the management table 3*e*1 can be realized by an area of a nonvolatile storage medium, such as a flash ROM (Read Only Memory), included in the controller 3.

The disclosed storage apparatus will now be described more concretely.

(Second Embodiment)

Figure 2:
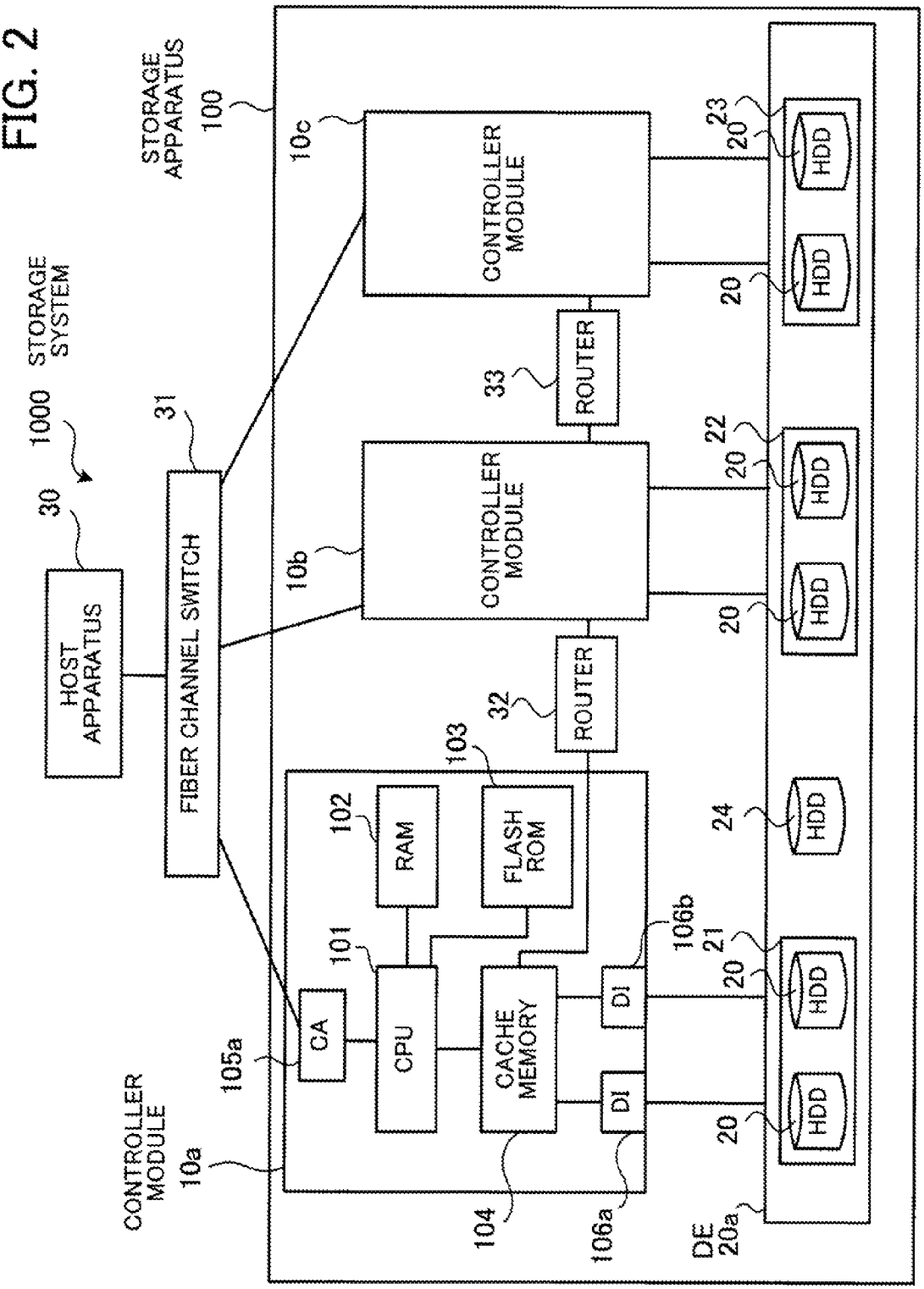
FIG. 2 is a block diagram of a storage system according to a second embodiment.

FIG. 2 is a block diagram of a storage system according to a second embodiment.

A storage system 1000 includes a host apparatus 30 and a storage apparatus 100 connected to the host apparatus 30 via an FC (Fiber Channel) switch 31. In FIG. 2, one host apparatus 30 is connected to the storage apparatus 100. However, a plurality of host apparatus may be connected to the storage apparatus 100.

The storage apparatus 100 includes a DE (Drive Enclosure) 20*a* including a plurality of HDDs 20 and CMs (Controller Modules) 10*a*, 10*b*, and 10*c* which manage a physical storage area of the drive enclosure 20*a* by RAID (Redundant Arrays of Inexpensive/Independent Disks). In this embodiment the HDDs 20 are indicated as examples of storage mediums included in the drive enclosure 20*a*. However, other storage mediums such as SSDs may be used. If distinctions are not made among the plurality of HDDs included in the drive enclosure 20*a*, hereinafter the plurality of HDDs 20 will be referred to as a "HDD 20 group". The total capacity of the HDD 20 group is, for example, 600 GB (GigaByte) to 240 TB (TeraByte).

The storage apparatus 100 uses the three controller modules 10*a*, 10*b*, and 10*c* for operation. By doing so, redundancy is ensured. The number of controller modules included in the storage apparatus 100 is not limited to three. Redundancy may be ensured by the use of two or four or more controller modules. Alternatively, only the controller module 10*a* may be used.

Each of the controller modules 10*a*, 10*b*, and 10*c* is an example of a controller. The controller modules 10*a*, 10*b*, and 10*c* are realized by the same hardware configuration.

Each of the controller modules 10*a*, 10*b*, and 10*c* controls access to data stored in a physical storage area of an HDD 20 included in the drive enclosure 20*a* by RAID in response to a data access request from the host apparatus 30.

The controller modules 10*a*, 10*b*, and 10*c* are realized by the same hardware configuration, so the hardware configuration of the controller module 10*a*, for example, will be described.

The controller module 10*a* includes a CPU 101, a RAM (Random Access Memory) 102, a flash ROM 103, a cache memory 104, a CA (Channel Adapter) 105*a*, and DIs (Device Interfaces) 106*a* and 106*b*.

The CPU 101 controls the whole of the controller module 10*a* synthetically by executing programs stored in the flash ROM 103 and the like. The RAM 102 temporarily stores at least a part of a program executed by the CPU 101 and various pieces of data which the CPU 101 needs to perform a process based on the program. The flash ROM 103 is a nonvolatile memory and stores a program executed by the CPU 101, various pieces of data which the CPU 101 needs to execute the program, and the like.

In addition, data stored in the cache memory 104 is saved in the flash ROM 103 at the time of, for example, a power failure of the storage apparatus 100.

The cache memory 104 temporarily stores data written to the HDD 20 group or read out from the HDD 20 group.

For example, when the controller module 10*a* receives a data read instruction from the host apparatus 30, the controller module 10*a* determines whether or not data to be read out is stored in the cache memory 104. If the data to be read out is stored in the cache memory 104, then the controller module 10*a* transmits the data to be read out which is stored in the cache memory 104 to the host apparatus 30. The controller module 10*a* can quickly transmit the data to the host apparatus 30, compared with the case where the controller module 10*a* reads out the data to be read out from the HDD 20 group.

In addition, the cache memory 104 may temporarily store data which the CPU 101 needs to perform a process. For example, a volatile semiconductor device, such as an SRAM, is used as the cache memory 104. Furthermore, there is no special limit to the storage capacity of the cache memory 104. The storage capacity of the cache memory 104 is, for example, about 2 to 64 GB.

The channel adapter 105*a* is connected to the fiber channel switch 31 and is connected to a channel of the host apparatus 30 via the fiber channel switch 31. The channel adapter 105*a* provides an interface function for exchanging data between the host apparatus 30 and the controller module 10a.

The device interfaces 106a and 106b are connected to the drive enclosure 20a. The device interfaces 106a and 106b provide an interface function for exchanging data between the HDD 20 group included in the drive enclosure 20a and the cache memory 104. The controller module 10a exchanges data via the device interfaces 106a and 106b with the HDD 20 group included in the drive enclosure 20a.

The controller modules 10a, 10b, and 10c are connected to one another via routers 32 and 33. For example, when data is transmitted from the host apparatus to the controller module 10a via the channel adapter 105a and the host apparatus 30 requests the controller module 10a to write the data to the HDD 20 group, the CPU 101 stores the received data in the cache memory 104. In addition, the CPU 101 not only stores the received data in the cache memory 104 but also transmits the received data to the controller modules 10b and 10c via the routers 32 and 33. A CPU included in each of the controller modules 10b and 10c then stores the received data in its cache memory. By doing so, the same data is stored in the cache memory 104 of the controller module 10a and the cache memories of the controller modules 10b and 10c.

A RAID group made up of one or more HDDs 20 of the plurality of HDDs 20 included in the drive enclosure 20a is formed in the drive enclosure 20a. This RAID group may also be referred to as a "logical volume," a "virtual disk," an "RLU (RAID Logical Unit)," or the like.

In FIG. 2, three RAID groups 21, 22, and 23 the RAID level of each of which is RAID1 are indicated. The structure of each RAID group is taken as an example. Each RAID group may have another structure. For example, each of the RAID groups 21, 22, and 23 may include any number of HDDs 20. Furthermore, the RAID groups 21, 22, and 23 may be set to any RAID level, such as RAID5 or RAID6.

In addition, an HDD 24 is included in the drive enclosure 20a in preparation for the occurrence of a failure in an HDD 20. For example, if reading out data from or writing data to an HDD 20 fails one or more times due to a fault or the like in the HDD 20, then the controller module 10a, 10b, or 10c determines that a failure has occurred. When the storage apparatus 100 is in operation, the HDD 24 is on standby in an energized state. The HDD 24 is referred to as a hot spare disk. When a failure occurs in an HDD 20 in any of the RAID groups 21, 22, and 23, a controller module that manages the HDD 20 in which the failure has occurred rebuilds data (same data that is) stored in the HDD 20 in which the failure has occurred in the HDD 24. When the HDD 20 in which the failure has occurred is replaced with a normal HDD 20, the controller module that manages the HDD 20 in which the failure has occurred copies back the data stored in the HDD 24 to the normal HDD 20 with which the HDD 20 in which the failure has occurred is replaced. The copy-back process is performed in the background.

For example, storage areas of HDDs 20 which make up the RAID group 21 are logically divided. A LUN (Logical Unit Number) is set for each storage area after the division. The controller module 10a includes a table (hereinafter referred to as the "LUN management table") for managing set LUNs.

Figure 3:
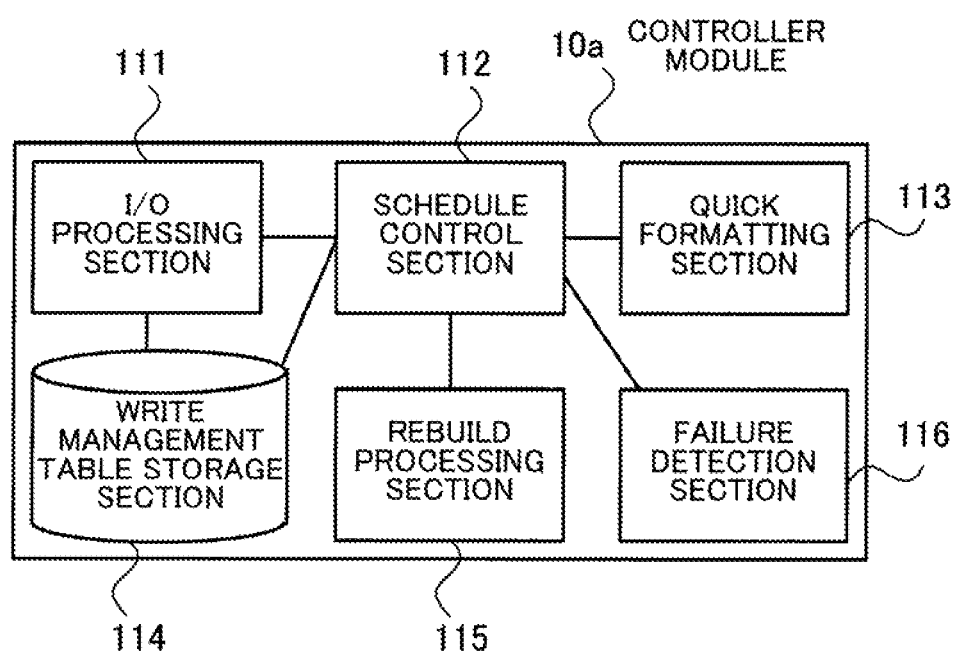
FIG. 3 is a block diagram of the functions of a controller module in the second embodiment.

FIG. 3 is a block diagram of the functions of the controller module in the second embodiment.

The controller module 10a includes an I/O control section 111, a schedule control section 112, a quick formatting section 113, a write management table storage section 114, a rebuild processing section 115, and a failure detection section 116.

The I/O control section 111 controls I/O access from the host apparatus 30.

When the failure detection section 116 of the controller module 10a informs the schedule control section 112 that a failure has occurred in an HDD 20 included in the RAID group 21 during quick formatting by the quick formatting section 113, the schedule control section 112 gives the rebuild processing section 115 instructions to perform a rebuild process corresponding to a state in which data is written to a set LUN. In addition, when the HDD 20 in which the failure has occurred is replaced with a normal HDD 20, the schedule control section 112 gives the rebuild processing section 115 instructions to perform a copy-back process corresponding to the state in which data is written to the set LUN.

The quick formatting section 113 performs quick formatting by the LUN in a storage area of an HDD 20 included in the RAID group 21. Quick formatting is an example of formatting. Quick formatting is performed in the following way. The quick formatting section 113 permits the host apparatus 30 access to the RAID group 21 before actually performing logical formatting and then performs the logical formatting in the background of the access by the host apparatus 30. In this embodiment two kinds of quick formatting are defined: one-point formatting and sequential formatting. One-point formatting is performed in an area corresponding to an I/O request which the I/O control section 111 receives from the host apparatus 30. Sequential formatting is performed sequentially in the storage areas of the HDDs 20 which make up the RAID group 21 regardless of an I/O request from the host apparatus 30.

In addition, the quick formatting section 113 includes a table (hereinafter referred to as the "progress table") for managing the progress of quick formatting according to LUNs.

The write management table storage section 114 stores a write management table for managing writing to a LUN included in a storage area of an HDD 20 at quick formatting time. The write management table storage section 114 is an example of a storage section.

When the above failure has occurred in the HDD 20, the rebuild processing section 115 performs a rebuild process and a copy-back process. The rebuild processing section 115 includes a table (hereinafter referred to as the "rebuild management table") for managing a rebuild process according to set LUNs and a table (hereinafter referred to as the "copy-back management table") for managing a copy-back process according to set LUNs. When the rebuild processing section 115 performs a rebuild process, the rebuild processing section 115 sets a column in the rebuild management table corresponding to a LUN in which a rebuild process has ended to "rebuild completed". When the rebuild management table is referred to, it is possible to determine whether or not a rebuild process is completed in each set LUN. Furthermore, When the rebuild processing section 115 performs a copy-back process, the rebuild processing section 115 sets a column in the copy-back management table corresponding to a LUN in which a copy-back process has ended to "copy-back completed". When the copy-back management table is referred to, it is possible to determine whether or not a copy-back process is completed in each set LUN.

The failure detection section 116 detects that the failure has occurred in the HDD 20 included in the RAID group 21.

FIG. 4 is an example of a write management table.

A write management table 114a indicated in FIG. 4 includes LUN and QF (Quick Format) columns. Pieces of information arranged in the vertical direction are associated with each other.

Information for identifying LUNs set in the RAID group 21 is set in the LUN column.

Information for determining whether or not the host apparatus 30 writes data to a LUN in which quick formatting is being performed is set in the QF column. That is to say, "Yes" indicates that the host apparatus 30 writes data to a LUN in which the quick formatting section 113 is performing quick formatting. On the other hand, "No" indicates that the host apparatus 30 does not write data to a LUN in which the quick formatting section 113 is performing quick formatting.

Write management tables including the same information that is included in the write management table 114a are constructed in the controller modules 10b and 10c. The write management table constructed in the controller module 10b manages the state of the progress of quick formatting in LUNs set in the RAID group 22. The write management table constructed in the controller module 10c manages the state of the progress of quick formatting in LUNs set in the RAID group 23.

Quick formatting performed by the controller module 10a will now be described.

FIGS. 5A through 5C and FIGS. 6A and 6B are views for describing quick formatting performed by the controller module.

Figure 5A:
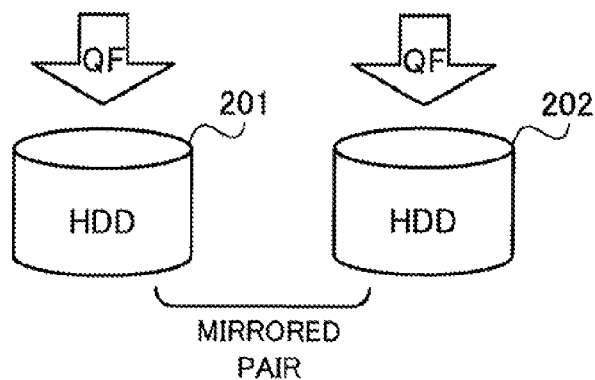
FIGS. 5A, 5B, and 5C are views for describing quick formatting performed by the controller module.
Figure 5B:
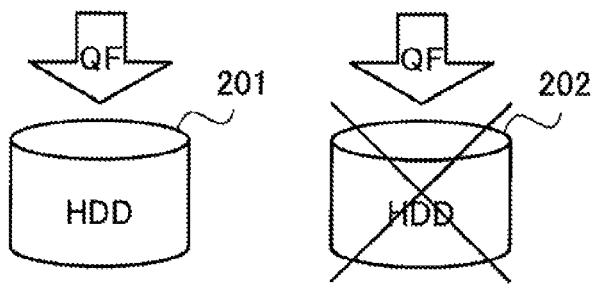
Figure 5C:
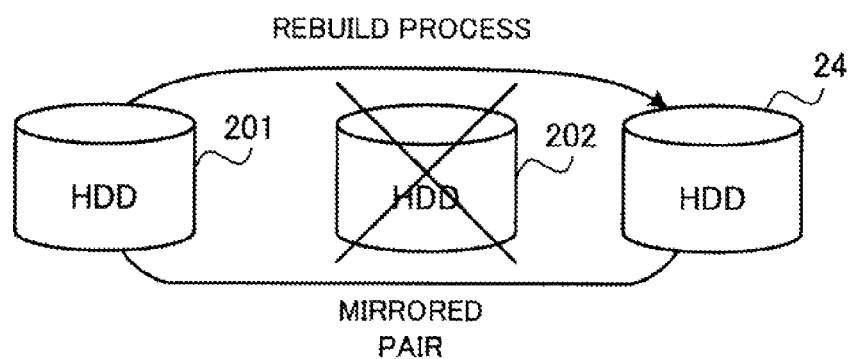

HDDs 201 and 202 illustrated in FIGS. 5A through 5C are two of the plurality of HDDs 20 which make up the RAID group 21. I/O data from the host apparatus 30 is written to the HDDs 201 and 202 at the same time. That is to say, the HDDs 201 and 202 form what is called a mirrored pair. In order to begin quick formatting in the HDDs 201 and 202, the schedule control section 112 gives the quick formatting section 113 instructions to begin quick formatting. As illustrated in FIG. 5A, the quick formatting section 113 begins to perform quick formatting in the HDDs 201 and 202.

FIG. 5B indicates a state in which a fault has occurred after the beginning of the quick formatting in the HDD 202 in which the quick formatting is being performed. If a fault has occurred in the HDD 202, then the schedule control section 112 gives the rebuild processing section 115 instructions to perform a rebuild process.

FIG. 5C indicates a rebuild process performed by the rebuild processing section 115. The rebuild processing section 115 rebuilds (restores) data stored in the HDD 201 in the HDD 24. The same data that is stored in the HDD 202 in which the failure has occurred is stored in the HDD 201. When the rebuild process ends, a mirrored pair is formed by the HDDs 201 and 204. After that, the schedule control section 112 gives the quick formatting section 113 instructions to resume the quick formatting.

Figure 6A:
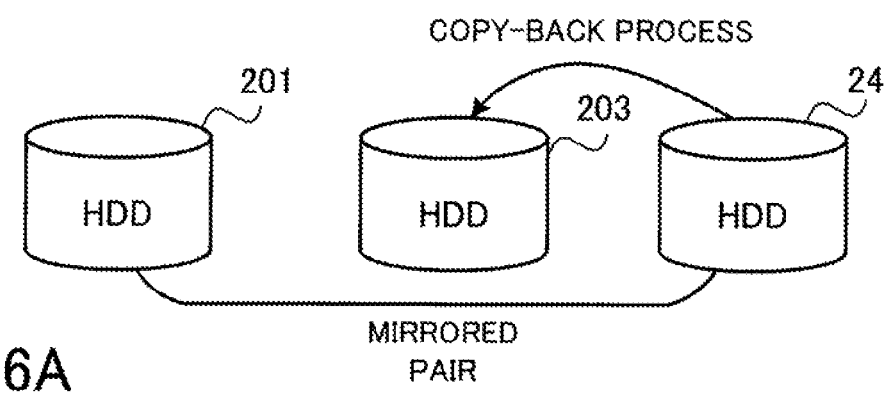
FIGS. 6A and 6B are views for describing quick formatting performed by the controller module.
Figure 6B:
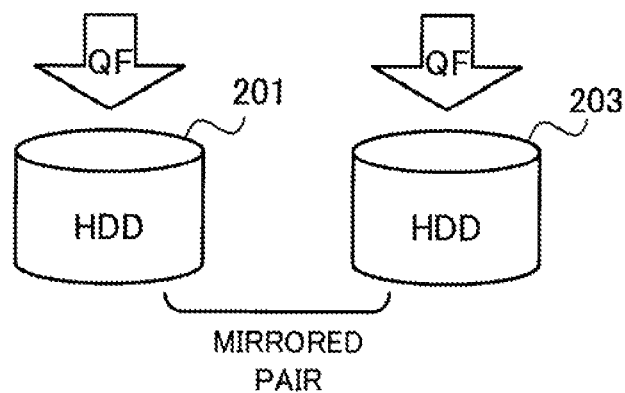

After that, a new HDD 203 is mounted in place of the HDD 202 in which the failure has occurred. At this time, as illustrated in FIG. 6A, the schedule control section 112 gives the rebuild processing section 115 instructions to perform a copy-back process. The rebuild processing section 115 copies back the data stored in the HDD 24 to the new HDD 203. When the copy-back process ends, a mirrored pair is formed by the HDDs 201 and 203. As illustrated in FIG. 6B, the schedule control section 112 gives the quick formatting section 113 instructions to resume the quick formatting.

A process performed by the schedule control section 112 in the state illustrated in FIGS. 5B and 5C, that is to say, at the time of the occurrence of the failure in the HDD 202 after the beginning of the quick formatting by the quick formatting section 113 will now be described by the use of a flow chart.

Figure 7:
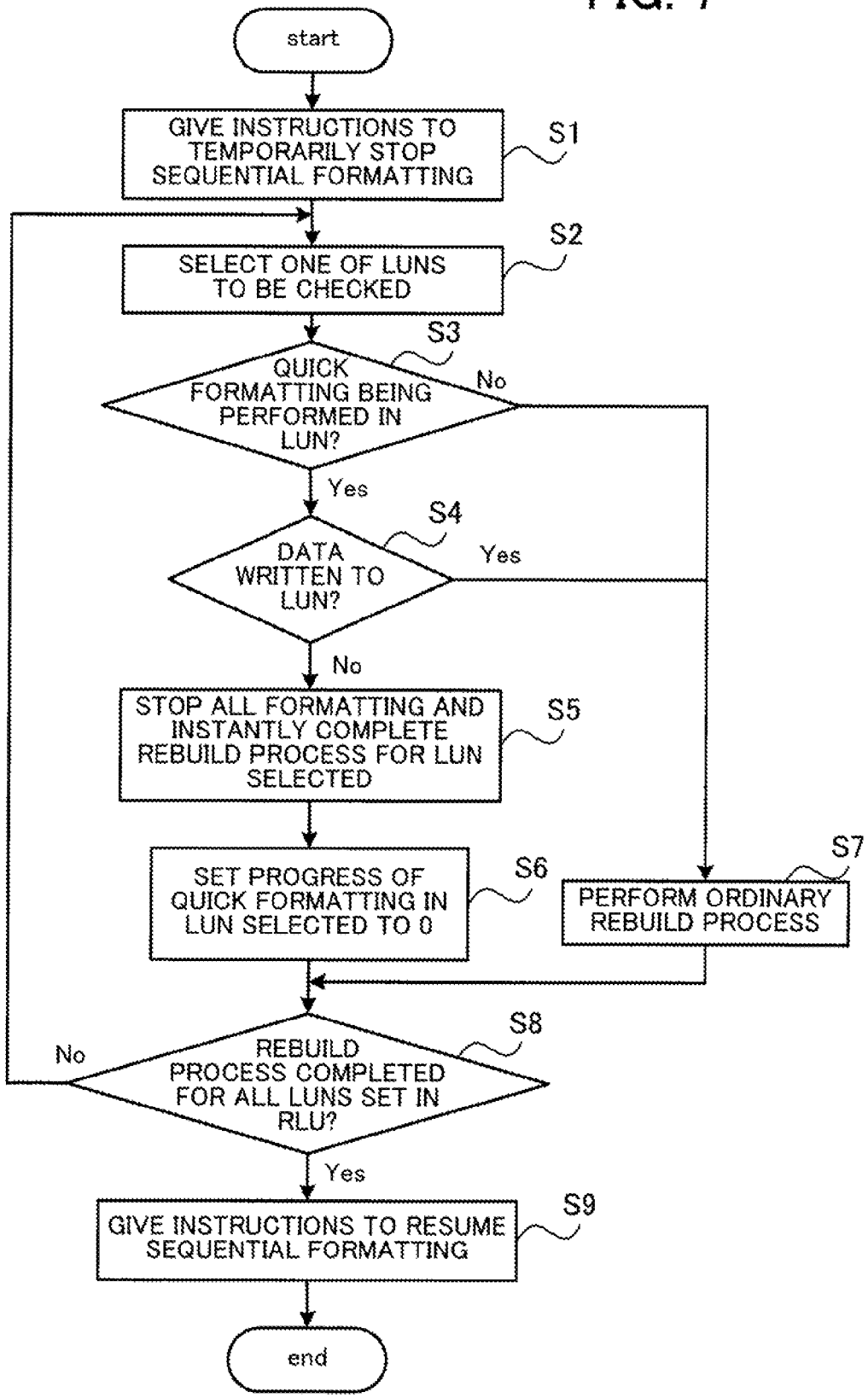
FIG. 7 is a flow chart of a process performed by a schedule control section.

FIG. 7 is a flow chart of a process performed by the schedule control section.

(Step S1)
When the failure detection section 116 of the controller module 10a informs the schedule control section 112 that a failure has occurred in an HDD included in the RAID group 21, the schedule control section 112 gives the quick formatting section 113 instructions to temporarily stop sequential formatting. In accordance with these instructions the quick formatting section 113 temporarily stops the sequential formatting. In addition, the quick formatting section 113 stores the temporary stoppage of the sequential formatting in a storage area (not illustrated) of, for example, the quick formatting section 113. However, when the quick formatting section 113 is performing one-point formatting or newly accepts a request to perform one-point formatting, the quick formatting section 113 performs the one-point formatting. Furthermore, at the time when the quick formatting section 113 stops the sequential formatting, the progress table is not rewritten. That is to say, even when the quick formatting section 113 stops the sequential formatting in a LUN set in the RAID group 21, information which is indicative that the sequential formatting is being performed in the LUN is set in the progress table. After that, the schedule control section 112 proceeds to step S2.

(Step S2) The schedule control section 112 refers to the rebuild management table and selects one of LUNs to be checked. After that, the schedule control section 112 proceeds to step S3.

(Step S3) The schedule control section 112 refers to the progress of quick formatting in each LUN stored in the progress table, and determines whether or not quick formatting is being performed in the LUN selected in step S2. If a quick formatting is being performed in the LUN selected in step S2 ("Yes" in step S3), then the schedule control section 112 proceeds to step S4. If quick formatting is not being performed in the LUN selected in step S2 ("No" in step S3), then the schedule control section 112 proceeds to step S7.

(Step S4) The schedule control section 112 refers to the write management table 114a and determines whether or not data is written to the LUN selected in step S2. If data is written to the LUN selected in step S2 ("Yes" in step S4), then the schedule control section 112 proceeds to step S7. If data is not written to the LUN selected in step S2 ("No" in step S4), then the schedule control section 112 proceeds to step S5.

(Step S5) The schedule control section 112 informs the quick formatting section 113 that all formatting is stopped in the LUN selected in step S2. As a result, even when the quick formatting section 113 is performing one-point formatting in the LUN selected in step S2, the quick formatting section 113 stops the one-point formatting. The schedule control section 112 then gives the rebuild processing section 115 instructions to instantly complete a rebuild process for the LUN selected in step S2. The rebuild processing section 115 which receives these instructions sets a column in the rebuild management table corresponding to the LUN selected in step S2 to "rebuild completed". That is to say, if data is not written to the LUN selected in step S2, to perform a rebuild process is omitted.

When the schedule control section 112 receives from the rebuild processing section 115 notice that the rebuild processing section 115 sets the column in the rebuild management table corresponding to the LUN selected in step S2 to "rebuild completed", the schedule control section 112 proceeds to step S6.

(Step S6) The schedule control section 112 sets a column in the progress table corresponding to the progress of quick formatting in the LUN selected in step S2 to 0 (no progress). After that, the schedule control section 112 proceeds to step S8.

(Step S7) The schedule control section 112 gives the rebuild processing section 115 instructions to perform an ordinary rebuild process (which differs from the rebuild process in step S5). As a result, the rebuild processing section 115 reads out all data stored in the HDD 201, and writes the data read out to the HDD 24. After that, the schedule control section 112 proceeds to step S8.

(Step S8) The schedule control section 112 refers to the state of the progress of a rebuild process for each LUN in the rebuild management table and determines whether or not a rebuild process is completed for all LUNs set in the RAID group 21. If a rebuild process is completed for all the LUNs set in the RAID group 21 ("Yes" in step S8), then the schedule control section 112 proceeds to step S9. If a rebuild process is not completed for all the LUNs set in the RAID group 21 ("No" in step S8), then the schedule control section 112 proceeds to step S2. A LUN to be checked is selected in step S2 and steps S3 ff. are then performed.

(Step S9) The schedule control section 112 gives the quick formatting section 113 instructions to resume the sequential formatting which is temporarily stopped in step S1. After that, the schedule control section 112 terminates the process indicated in FIG. 7.

The above is the description of the process indicated in FIG. 7.

A process performed by the schedule control section 112 in the state illustrated in FIG. 6A, that is to say, at the time of the HDD 203 being mounted in place of the HDD 202 after the resumption and during the performance of the quick formatting by the quick formatting section 113 will now be described by the use of a flow chart.

Figure 8:
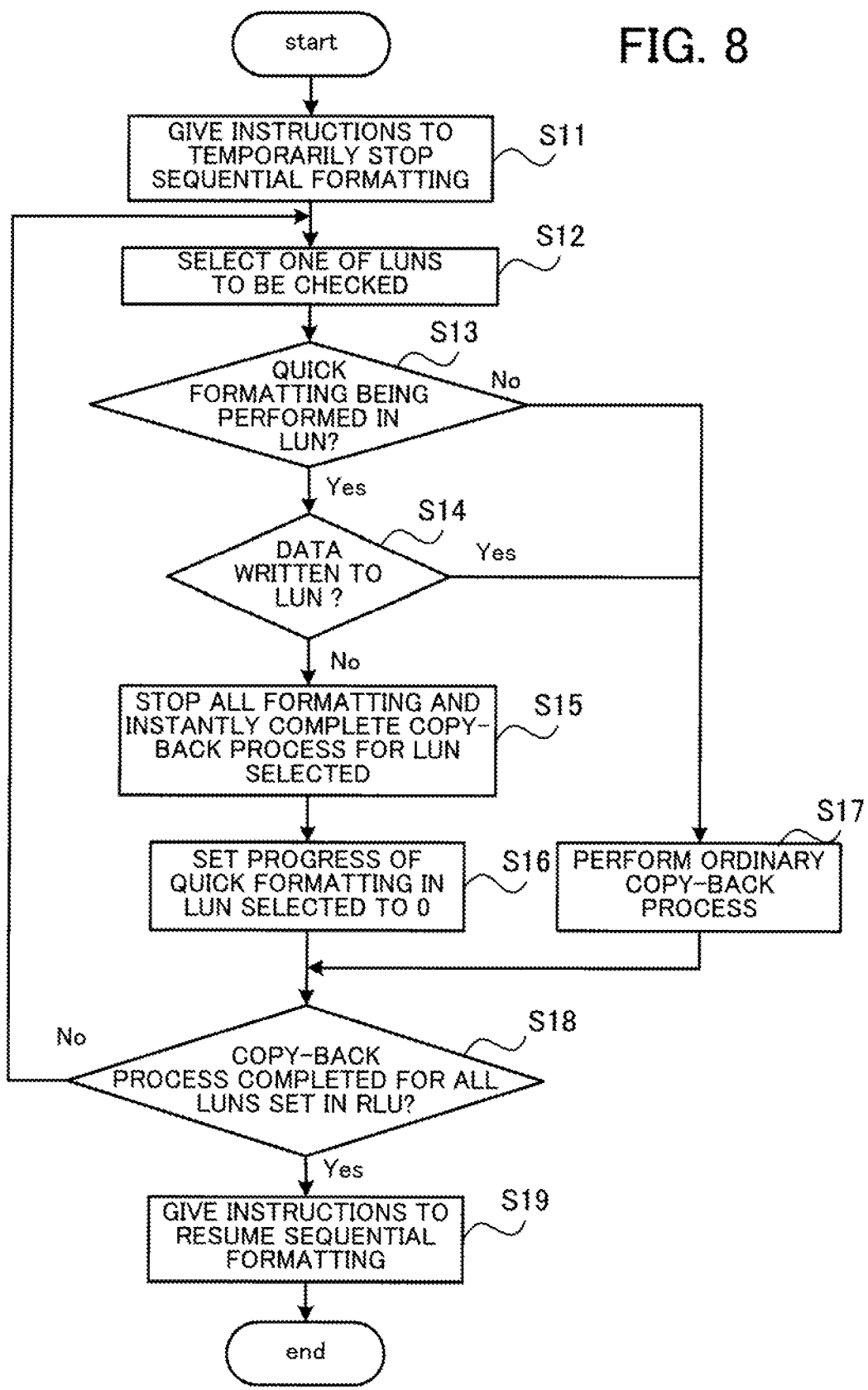
FIG. 8 is a flow chart of a process performed by the schedule control section.

FIG. 8 is a flow chart of a process performed by the schedule control section.

(Step S11) When a section of the controller module 10a which detects the replacement of an HDD 20 informs the schedule control section 112 that the HDD 203 is mounted in place of the HDD 202 in which the failure has occurred, the schedule control section 112 gives the quick formatting section 113 instructions to temporarily stop the sequential formatting. In accordance with these instructions the quick formatting section 113 temporarily stops the sequential formatting. However, when the quick formatting section 113 is performing one-point formatting or newly accepts a request to perform one-point formatting, the quick formatting section 113 performs the one-point formatting. Furthermore, at the time when the quick formatting section 113 stops the sequential formatting, the progress table is not rewritten by the use of initialization data or the like and holds information at the time of the sequential formatting being stopped. That is to say, even when the quick formatting section 113 stops the sequential formatting in a LUN set in the RAID group 21, information which is indicative that the sequential formatting is being performed in the LUN is set in the progress table. After that, the schedule control section 112 proceeds to step S12.

(Step S12) The schedule control section 112 refers to the copy-back management table and selects one of LUNs to be checked. After that, the schedule control section 112 proceeds to step S13.

(Step S13) The schedule control section 112 refers to the progress table and determines whether or not quick formatting is being performed in the LUN selected in step S12. If quick formatting is being performed in the LUN selected in step S12 ("Yes" in step S13), then the schedule control section 112 proceeds to step S14. If quick formatting is not being performed in the LUN selected in step S12 ("No" in step S13), then the schedule control section 112 proceeds to step S17.

(Step S14) The schedule control section 112 refers to the write management table 114a and determines whether or not data is written to the LUN selected in step S12. If data is written to the LUN selected in step S12 ("Yes" in step S14), then the schedule control section 112 proceeds to step S17. If data is not written to the LUN selected in step S12 ("No" in step S14), then the schedule control section 112 proceeds to step S15.

(Step S15) The schedule control section 112 informs the quick formatting section 113 that all formatting is stopped in the LUN selected in step S12. As a result, even when the quick formatting section 113 is performing one-point formatting in the LUN selected in step S12, the quick formatting section 113 stops the one-point formatting. The schedule control section 112 then gives the rebuild processing section 115 instructions to instantly complete a copy-back process for the LUN selected in step S12. The rebuild processing section 115 which receives these instructions sets a column in the copy-back management table corresponding to the LUN selected in step S12 to "copy-back completed". That is to say, if data is not written to the LUN selected in step S12, to perform a copy-back process is omitted.

When the schedule control section 112 receives from the rebuild processing section 115 notice that the rebuild processing section 115 sets the column in the copy-back management table corresponding to the LUN selected in step S12 to "copy-back completed", the schedule control section 112 proceeds to step S16.

(Step S16) The schedule control section 112 sets a column in the progress table corresponding to the progress of quick formatting in the LUN selected in step S12 to 0 (no progress). After that, the schedule control section 112 proceeds to step S18.

(Step S17) The schedule control section 112 gives the rebuild processing section 115 instructions to perform an ordinary copy-back process (which differs from the copy-back process in step S15). As a result, the rebuild processing section 115 reads out all data stored in the HDD 24, and writes the data read out to the HDD 203. After that, the schedule control section 112 proceeds to step S18.

(Step S18) The schedule control section 112 refers to the copy-back management table and determines whether or not a copy-back process is completed for all LUNs set in the RAID group 21. If a copy-back process is completed for all the LUNs set in the RAID group 21 ("Yes" in step S18), then the schedule control section 112 proceeds to step S19. If a copy-back process is not completed for all the LUNs set in the RAID group 21 ("No" in step S18), then the schedule control section 112 proceeds to step S12. A LUN to be checked is selected in step S12 and steps S13 ff. are then performed.

(Step S19) The schedule control section 112 gives the quick formatting section 113 instructions to resume the sequential formatting which is temporarily stopped in step S11. After that, the schedule control section 112 terminates the process indicated in FIG. 8.

The above is the description of the process indicated in FIG. 8.

As has been described in the foregoing, according to the controller module 10a the schedule control section 112 performs the process indicated in FIG. 7. By doing so, the sequential formatting is temporarily stopped and the rebuild process is performed before the sequential formatting. The process indicated in FIG. 7 makes it possible to avoid performing the rebuild process and the quick formatting at the same time. In addition, the schedule control section 112 performs the process indicated in FIG. 8. By doing so, the sequential formatting is temporarily stopped and the copy-back process is performed before the sequential formatting. The process indicated in FIG. 8 makes it possible to avoid performing the copy-back process and the quick formatting at the same time. For example, if the rebuild process or the copy-back process drags on, a fault may occur in an HDD 20 which forms a mirrored pair and in which a fault has not occurred, and stored data may be lost. However, avoiding performing the rebuild process and the quick formatting at the same time or performing the copy-back process and the quick formatting at the same time prevents this possibility.

In addition, by avoiding performing the rebuild process and the quick formatting at the same time or performing the copy-back process and the quick formatting at the same time, time taken to perform the rebuild process or the copy-back process separately can be determined comparatively easily compared with the case where the rebuild process and the quick formatting or the copy-back process and the quick formatting are performed at the same time. Accordingly, time taken to perform each of the rebuild process and the copy-back process can be estimated easily.

Furthermore, if data is not written to the LUN selected in step S2 of FIG. 7, to perform a rebuild process is omitted in step S5 of FIG. 7. The LUN is to be formatted by quick formatting performed later. Accordingly, by performing step S5, the extra trouble of performing a rebuild process and rebuilding data can be saved. In addition, the rebuild process can be completed quickly. Moreover, if data is not written to the LUN selected in step S12 of FIG. 8, to perform a copy-back process is omitted in step S15 of FIG. 8. The LUN is to be formatted by quick formatting performed later. Accordingly, by performing step S15, the extra trouble of performing a copy-back process and copying back data can be saved. In addition, the copy-back process can be completed quickly. Furthermore, by performing the processes indicated in FIGS. 7 and 8, it is possible to omit performing a rebuild process and a copy-back process without a table for determining whether or not writing is performed by the stripe which is a part of a storage area of each of the HDDs 20 which make up the RAID group 21.

In addition, if the quick formatting and the rebuild process are performed at the same time, a load on a transmission line or a disk may become heavy. A heavy load on the transmission line or the disk may also cause a delay. According to the controller module 10a a delay caused by a heavy load on the transmission line or the disk can be controlled by the process of FIG. 7 performed by the schedule control section 112.

The storage apparatus and the controller according to the present invention have been described on the basis of the embodiments illustrated. However, the present invention is not limited to these embodiments. The structure of each section can be replaced with any structure having the same function. In addition, any other section or process may be added to the present invention.

Furthermore, in the present invention the structures (characteristics) of the above two embodiments may be combined.

The above functions can be realized with a computer. In this case, a program in which the contents of the functions which the controller 3 and the controller modules 10a, 10b, and 10c have are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive, a flexible disk (FD), a magnetic tape, or the like. An optical disk can be a digital versatile disk (DVD), a DVD-RAM, a compact disk read only memory (CD-ROM)/rewritable (CD-RW), or the like. A magneto-optical recording medium can be a magneto-optical disk (MO) or the like.

To place the program on the market, portable record media, such as DVDs or CD-ROMs, on which it is recorded are sold. Alternatively, the program is stored in advance in a storage unit of a server computer and is transferred from the server computer to another computer via a network.

When the computer executes this program, it will store the program, which is recorded on a portable record medium or which is transferred from the server computer, on, for example, its storage unit. Then the computer reads the program from its storage unit and performs processes in compliance with the program. The computer can also read the program directly from a portable record medium and perform processes in compliance with the program. Furthermore, each time the program is transferred from the server computer connected thereto via a network, the computer can perform processes in turn in compliance with the program it receives.

In addition, at least a part of the above functions can be realized with an electronic circuit such as a DSP (Digital Signal Processor), an ASIC (Application Specific Integrated Circuit), or a PLD (Programmable Logic Device).

As has been described in the foregoing, according to the disclosed storage apparatus and controller a delay caused by performing a rebuild process and formatting at the same time can be controlled.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A storage apparatus comprising:
 a plurality of first drives configured to redundantly store data; and
 one or more processors connected to the first drives via a communication line for controlling writing of information to the first drives and configured to perform a procedure comprising:
 performing, in response to an I/O request received from a host apparatus, formatting in each storage area of the first drives that is corresponding to the received I/O request, before executing the received I/O request,
 detecting a failure that has occurred in one of the first drives, and
 stopping the formatting in entirety of the first drives in response to the detection of the failure and rebuilding the data originally stored in the first drives by using a second drive instead of the one of the first drives in which the failure has been detected.

2. The storage apparatus according to claim 1, wherein:
 the formatting is performed according to the logical storage areas logically set in the first drives; and
 the procedure further comprises:
 managing a table indicative of whether or not data is written according to the logical storage areas in which the formatting is being performed, and
 referring to the table, determining whether or not data is written to a logical storage area in which the formatting is being performed and which is included in the first drives in which the failure has occurred, and omitting, in the case of data not being written to the logical storage area, to rebuild data stored in the logical storage area in the second drive.

3. The storage apparatus according to claim 2, wherein the formatting is performed from first in logical storage areas which are included in a first drive in which a failure has not occurred and for which the rebuilding is omitted.

4. The storage apparatus according to claim 2, wherein, in copying back the data rebuilt in the second drive to a third drive prepared in place of the first drive in which the failure has occurred, the procedure further comprises referring to the table, determining whether or not data is written to a logical storage area in which formatting is being performed, and omitting, in the case of data not being written to the logical storage area, to copy back data stored in the logical storage area to the third drive.

5. The storage apparatus according to claim 2, wherein, after temporarily stopping the formatting in the first drives regardless of an access request from a host apparatus, the procedure further comprises determining whether or not data is written to a logical storage area in which the formatting is being performed and which is included in the first drives in which the failure has occurred.

6. A controller that is connected via a communication line to a plurality of first drives in which data is redundantly stored and that controls writing of information to the first drives, the controller comprising:

one or more processor configured to perform a procedure comprising:

performing, in response to an I/O request received from a host apparatus, formatting in each storage area of the first drives that is corresponding to the received I/O request, before executing the received I/O request, detecting a failure that has occurred in one of the first drives, and stopping the formatting in entirety of the first drives in response to the detection of the failure and rebuilding the data originally stored in the first drives by using a second drive instead of the one of the first drives in which the failure has been detected.

* * * * *